(12) United States Patent
Hua et al.

(10) Patent No.: US 10,748,314 B2
(45) Date of Patent: Aug. 18, 2020

(54) CONTROLLABLE CONDITIONAL IMAGE GENERATION

(71) Applicant: Microsoft Technology Licensing, LLC, Redmond, WA (US)

(72) Inventors: Gang Hua, Sammamish, WA (US); Navaneeth Kumar Bodla, Hyattsville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/897,466

(22) Filed: Feb. 15, 2018

(65) Prior Publication Data

US 2019/0251721 A1 Aug. 15, 2019

(51) Int. Cl.
*G06K 9/62* (2006.01)
*G06T 11/60* (2006.01)
*G06T 5/00* (2006.01)
*G06N 3/08* (2006.01)
*G06T 11/00* (2006.01)

(52) U.S. Cl.
CPC ............ *G06T 11/60* (2013.01); *G06N 3/08* (2013.01); *G06T 5/002* (2013.01); *G06T 11/00* (2013.01); *G06T 2207/20081* (2013.01); *G06T 2207/20084* (2013.01)

(58) Field of Classification Search
CPC ............ G06T 11/60; G06T 5/002; G06T 2207/20081; G06T 2207/20084; G06N 3/08
See application file for complete search history.

(56) References Cited

U.S. PATENT DOCUMENTS

| 9,036,040 B1 * | 5/2015 | Danko | H04N 5/225 348/222.1 |
|---|---|---|---|
| 2018/0089763 A1 * | 3/2018 | Okazaki | G06K 9/6273 |
| 2019/0080205 A1 * | 3/2019 | Kaufhold | G06K 9/6257 |
| 2019/0122404 A1 * | 4/2019 | Freeman | G06K 9/4652 |
| 2019/0205747 A1 * | 7/2019 | Srivastava | G06N 3/08 |
| 2019/0236774 A1 * | 8/2019 | Gros | G06T 7/0012 |

OTHER PUBLICATIONS

Google Scholar Search.*
Dai, et al., "Towards diverse and natural image descriptions via a conditional GAN", In Journal of the Computing Research Repository, Mar. 2017, 10 Pages.
(Continued)

*Primary Examiner* — Xin Jia

(57) ABSTRACT

A first generator stage of an image synthesis computer system generates an intermediate representation of an image that captures high-level structure of the image. The intermediate representation is generated from a random noise sample and without specific condition provided for the image. A second generator stage of the image synthesis computer system generates a conditional image based on i) the intermediate representation of the image and ii) a condition provided for the image, the condition specifying a desired style for the image. As a result, the conditional image is generated to match i) the high-level structure captured in the intermediate representation of the image and ii) the desired style specified by the condition provided for the image.

20 Claims, 6 Drawing Sheets

(56) References Cited

OTHER PUBLICATIONS

Goodfellow, et al., "Generative adversarial nets", In Proceedings of Advances in neural information processing systems, Dec. 8, 2014, pp. 1-9.

Gregor, et al., "Draw: A recurrent neural network for image generation", In Journal of the Computing Research Repository, Feb. 2015, 10 Pages.

Gulrajani, et al., "Improved training of wasserstein GANs", In Journal of the Computing Research Repository, Apr. 2017, 19 Pages.

Horn, et al., "Building a bird recognition app and large scale dataset with citizen scientists: The fine print in fine-grained dataset collection", In Proceedings of the IEEE Conference on Computer Vision and Pattern Recognition, Jun. 7, 2015, pp. 595-604.

Isola, et al., "Image-to-image translation with conditional adversarial networks", In Journal of the Computing Research Repository, Nov. 2016, 17 Pages.

Kingma, et al., "Auto-encoding variational bayes", In Journal of the Computing Research Repository, Dec. 2013, pp. 1-14.

Liu, et al., "Deep learning face attributes in the wild", In Proceedings of International Conference on Computer Vision, Dec. 7, 2015, pp. 3730-3738.

Mirza, et al., "Conditional generative adversarial nets", In Journal of the Computing Research Repository, Nov. 2014, pp. 1-7.

Radford, et al., "Unsupervised Representation Learning with Deep Convolutional Generative Adversarial Networks", In Journal of the Computing Research Repository, Nov. 2015, pp. 1-16.

Reed, et al., "Generative adversarial text to image synthesis", In Journal of the Computing Research Repository, May 2016, 10 Pages.

Reed, et al., "Learning deep representations of tine-grained visual descriptions", In Proceedings of the IEEE Conference on Computer Vision and Pattern Recognition, Jun. 27, 2016, pp. 49-58.

Reed, et al., "Learning what and where to draw", In Advances in Neural Information Processing Systems, Dec. 5, 2016, pp. 1-9.

Salimans, et al., "Improved techniques for training GANs", In Advances in Neural Information Processing Systems, Dec. 5, 2016, 9 Pages.

Wah, et al., "The Caltech-UCSD Birds-200-2011 Dataset", In Technical Report CNS-TR-2011-001, Nov. 6, 2011, 8 Pages.

Wang, et al., "Generative image modeling using style and structure adversarial networks", In Proceedings of 14th European Conference on Computer Vision, Oct. 11, 2016, pp. 1-22.

Yan, et al., "Attribute2image: Conditional image generation from visual attributes", In Journal of the Computing Research Repository, Dec. 2015, pp. 1-19.

Zhang, et al., "StackGAN: Text to photo-realistic image synthesis with stacked generative adversarial networks", In Journal of the Computing Research Repository, Dec. 2016, 14 Pages.

Zhu, et al., "Be your own Prada: Fashion synthesis with structural coherence", In Journal of the Computing Research Repository, Oct. 2017, pp. 1680-1688.

Zhu, et al., "Unpaired Image-to-Image Translation using Cycle-Consistent Adversarial Network", In Journal of the Computing Research Repository, Mar. 2017, 20 Pages.

\* cited by examiner

← 300

Require: $m$: the batch size; $\theta_s$: initial $G_s$ network parameters; $\theta_u$: initial $G_u$ network parameters; $\theta_e$: initial $E$ network parameters; $\theta_c$: initial $G_c$ network parameters; $\theta_{du}$: initial $D_u$ network parameters; $\theta_{dc}$: initial $D_c$ network parameters.

1: while $\theta_c$ has not converged do
2:     Sample $x_r \sim P_r$ a batch from the real data;
3:     Sample $z \sim N(0, I)$ a batch from noise vectors;
4:     $M_s \leftarrow G_s(z)$;
5:     $x_{uf} \leftarrow G_u(M_s)$;
6:     $L_{G_u} \leftarrow \log D_u(x_{uf})$;
7:     $L_{D_u} \leftarrow \log D_u(x_r) + \log(1 - D_u(x_{uf}))$;
8:     $\theta_{du} \xleftarrow{+} -\nabla_{\theta_{du}}(L_{D_u})$;
9:     $\theta_u \xleftarrow{+} -\nabla_{\theta_u}(L_{G_u})$;
10:    $\theta_s \xleftarrow{+} -\nabla_{\theta_s}(L_{G_u})$;
11:    Sample $(x_{cr}, y) \sim P_{cr}$ a batch from the conditional real data;
12:    $M_y \leftarrow E(y)$;
13:    $x_{cf} \leftarrow G_c(M_y, M_c)$;
14:    $L_{G_c} \leftarrow \log D_c(x_{cf}, y)$;
15:    $L_{D_c} \leftarrow \log D_c(x_{cr}, y) + \log(1 - D_c(x_{cf}, y))$;
16:    $\theta_y \xleftarrow{+} -\nabla_{\theta_y}(L_{G_c})$;
17:    $\theta_e \xleftarrow{+} -\nabla_{\theta_e}(L_{G_c})$;
18:    $\theta_{dc} \xleftarrow{+} -\nabla_{\theta_{dc}}(L_{D_u})$;
19: end while

CONTROLLABLE CONDITIONAL IMAGE GENERATION

FIELD OF THE DISCLOSURE

The present disclosure relates generally to image generation and, more particularly, to conditional image generation using neural networks.

BACKGROUND

Computer image synthesis or generation refers to a process of generating realistic images of objects, landscapes, people, faces, and the like. For example, neural networks, such as deep generative neural networks, may be employed in image generation in various applications such as generating super-resolution images from low resolution images, image in-painting, text-to-image synthesis, attribute-to-face synthesis and the like. Such neural network systems may generate images by random sampling, or may generate conditional images that match specific conditions. Conditional image generation may find use in many diverse applications, such as in forensics applications where an image of a face of a suspect may be generated to match a description of the suspect; in education or research applications, where fine-grained images of, for example, birds may be generated to match specific descriptions of the birds; and so on. Current image generations systems, however, lack ability to generate sufficiently diverse image and/or are unable to produce images with sufficiently high fidelity. Moreover, current image generation systems are not controllable in that they lack ability to sample images by controlled change of factors such as posture, style, background, fine-grained details, and the like.

SUMMARY

In an embodiment, a method for synthesizing an image includes generating, using a first generator stage of an image synthesis computer system, an intermediate representation of an image, wherein the intermediate representation captures high-level structure of the image, and wherein the intermediate representation is generated from a random noise sample and without specific condition provided for the image. The method additionally includes generating, using a second generator stage of the image synthesis computer system, a conditional image, wherein the conditional image is generated based on i) the intermediate representation of the image generated by the first generator stage and ii) a condition provided for the image, the condition specifying a desired style for the image, such that the conditional image is generated to match i) the high-level structure captured in the intermediate representation of the image and ii) the desired style specified by the condition provided for the image.

In another embodiment, an image synthesis computer system comprises a first generator stage configured to generate an intermediate representation of an image, wherein the intermediate representation captures high-level structure of the image, and wherein the intermediate representation is generated from a random noise sample and without specific condition provided for the image. The image synthesis computer system additionally comprises a second generator stage configured to generate a conditional image, wherein the conditional image is generated based on i) the intermediate representation of the image and ii) a condition provided for the image, the condition specifying a desired style for the image, such that the conditional image is generated to match i) the high-level structure captured in the intermediate representation of the image and ii) the desired style specified by the condition provided for the image.

In still another embodiment, a tangible computer readable medium, or media, storing machine readable instructions that, when executed by one or more processors, cause the one or more processors to: generate an intermediate representation of an image, wherein the intermediate representation captures high-level structure of the image, and wherein the intermediate representation is generated from a random noise sample and without specific condition provided for the image; and generate a conditional image, wherein the conditional image is generated based on i) the intermediate representation of the image and ii) a condition provided for the image, the condition specifying a desired style for the image, such that the conditional image is generated to match i) the high-level structure captured in the intermediate representation of the image and ii) the desired style specified by the condition provided for the image.

BRIEF DESCRIPTION OF THE DRAWINGS

FIG. 3 is an illustration of a training algorithm that may be utilized to train image synthesis systems of FIGS. 1 and 2, according to embodiments;

DETAILED DESCRIPTION

Figure 1:
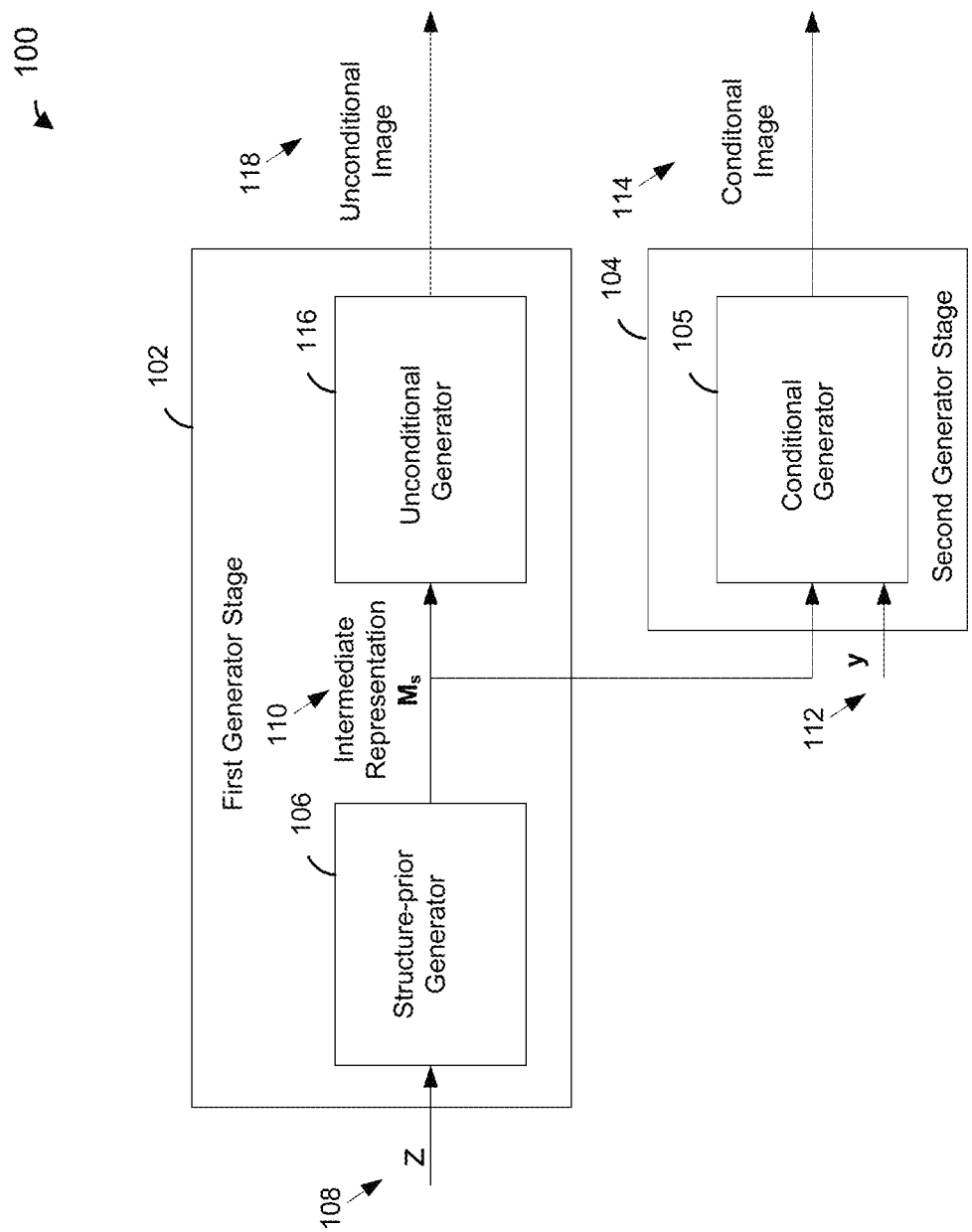
FIG. 1 is a block diagram of an example controllable conditional image synthesis system, according to an embodiment.

In various embodiments described below, an image synthesis systems synthesizes or generates desired images that match certain conditions, such as user-provided conditions, describing specific aspects or features of the images. In an embodiment, the image synthesis system separates the process of generating an image into multiple generator stages including i) a first generator stage that generates an intermediate representation of the image, defining a structure (e.g., outline, shape, posture, etc.) of the image and/or of an object depicted in the image and ii) a second generator stage that generates a conditional image based on a) the intermediate representation of the image and b) an input condition defining a style (e.g., fine-grained appearance of foreground and/or background) of the image. Accordingly, in an embodiment, the first generator stage is an unconditional generator stage configured to generate an intermediate representation of an image, and the second generator stage is a conditional generator that may transform the intermediate representation of the image into a final conditional image that matches a condition provided for the image.

The first generator stage and the second generator stage may each comprise one or more neural network, such as one or more deep convolutional neural network, for example. The one or more neural networks of the first generator stage may be trained to generate unconditional images from noise samples and without any specific conditions provided for the images, and the one or more neural networks of the second generator stage may be trained to generate conditional images to match specific conditions provided for the images. Because the first generator stage is generally an unconditional image generation stage and the second generator stage is generally a conditional image generation stage, the neural networks of the first generator stage and the second generator stage may be trained using semi-supervised training with both unsupervised training that utilizes unpaired or unlabeled training data and supervised training that utilizes paired or labeled training data. For example, the first generator stage may be trained using unsupervised training with an unpaired training dataset containing unpaired or unlabeled images of a target object or scene, and the second generator stage may be trained using supervised training with a paired training dataset containing images of the target object or scene paired or labeled with conditions defining specific features or styles of the object or scenes.

Such separation of image generation into multiple generator stages, including an unconditional generator stage and a conditional generator stage, may allow the image synthesis system to be trained to generate diverse images with high fidelity and high controllability, in various embodiments. For example, because larger unpaired datasets may be available for training the unconditional generator stage, a better intermediate representation defining a structure of an image may be learned, and higher-fidelity conditional images may be ultimately generated as compared images generated by image synthesis systems in which only supervised training is used. As another example, with respect to diversity and controllability, by fixing an intermediate representation of an image generated by the unconditional generator stage while varying style conditions provided to the conditional generator stage, the image synthesis system may generate diverse images having a same structure (e.g., a same shape, a same posture, etc.) but with varying styles (e.g., varying colors, varying features, etc.). The image synthesis system may thus be controlled to generate images having a same structure and depicting interpolation between two or more style conditions, for example. As another example, by fixing both the intermediate representation of an image generated by the unconditional generator stage and style conditions for the image provided to the second generator stage, the image synthesis system may generate diverse images having a same structure and a same style by with varying degrees fine-grained details.

FIG. 1 is a block diagram of an example controllable conditional image synthesis system 100, according to an embodiment. The image synthesis system 100 includes a first generator stage 102 and a second generator stage 104. The first generator stage 102 includes an unconditional structure-prior generator 106. The unconditional structure-prior generator 106 may be initialized by a random noise sample z 108, which may be a noise vector taken, for example, from a normal (e.g., Gaussian) distribution, and may generate an intermediate representation $M_s$ 110 of an image. The intermediate representation $M_s$ 110 may capture high-level information for generating the image, and may generally define a structure (e.g., an outline, a shape, a posture, etc.) of the image. The intermediate representation $M_s$ 110 may be provided to the second generator stage 104, and may be used as a structure-prior for generating a final conditional image by the second generator stage 104. The second generator stage 104 may include a conditional generator 105 that takes, as inputs, i) the intermediate representation $M_s$ 110, generated by the structure-prior generator 106, defining a structure of the image and ii) a conditional input y 112 defining a desired style of the image, and generates a final conditional image 114 having the structure defined by the intermediate representation $M_s$ 110 and the style defined by the conditional input y 112.

With continued reference to FIG. 1, the intermediate representation $M_s$ 110 generated by the structure-prior generator 106 may additionally be provided to an unconditional generator 116 of the first generator stage 102, and the unconditional generator 116 may generate an unconditional image 118 having the structure defined by the intermediate representation $M_s$ 110. Because the intermediate representation $M_s$ 110 generated by the structure-prior generator 106 is used both i) within the first generator stage 102 and ii) by the second generator stage 104, the first generator stage 102 and the second generator stage 104 are essentially "fused" together into a single stage generator wherein the structure-prior generator 106 serves as a fused block used both i) for unconditional image generation by the first generator stage 102 and ii) for conditional image generation by the second generator stage 104, in an embodiment. It is noted that the unconditional generator 116 may be included in the first generator stage 102 for training the structure-prior generator 106 of the first generator stage 102, and may be omitted from the first generator stage 102 after completion of training of the first generator stage 102, in some embodiments.

Referring still to FIG. 1, as just an example, the image synthesis system 100 may be configured to generate an image of an object such as, for example, a bird, in an embodiment. In this embodiment, the structure-prior generator 106 of the first generator stage 102 may generate an intermediate representation $M_s$ 110 defining an outline of a bird, including, for example, a shape and a posture of the bird. The conditional input y 112, provided to the second generator stage 104 may, in this case, be a text description of a desired style (e.g., bird size, beak length, wing shape, color, etc.) of the bird, for example. The second generator stage 104 may build on the intermediate representation $M_s$ 110 defining the shape and posture of the bird to generate a conditional image 114 to match the desired bird size, beak length, wing shape, color, etc. specified by the conditional input y 112 for the bird. As another example, in another embodiment, the image synthesis system 100 may be configured to generate an image of a person or a face. In this embodiment, the structure-prior generator 106 of the first generator stage 102 may generate an intermediate representation $M_s$ 110 defining an outline of the person or the face, including, for example, a shape and a pose of the person or the face. The conditional input y 112, provided to the second generator stage 106 may, in this case, be an attribute set describing desired features (e.g., hair color, eye color, presence of eyeglasses, presence of a smile, etc.) of the person or the face, for example. The second generator stage 106 may build on the intermediate representation $M_s$ 110 defining the shape and pose of the person or face to generate a conditional image 114 of the person or face to match the desired features such as hair color, eye color, presence of eyeglasses, presence of a smile, etc., specified by the conditional input y 112 for the person or face, in an embodiment.

With continued reference to FIG. 1, the first generator stage 102 and the second generator stage 104 may comprise one or more neural networks, such as, for example, one or more deep convolutional neural networks. In an embodiment, the one or more neural networks of the first generator stage 102 and the second generator stage 104 may be trained using generative adversarial network (GAN) framework, or may be trained using other suitable training techniques. GAN framework or other technique may be employed to train the neural networks of the first generator stage 102 and the second generator stage 104 end-to-end using semi-supervised training, in an embodiment. In general, semi-supervised training involves training neural networks using both unsupervised training with unpaired or unlabeled training data and supervised training with paired or labeled training data. As described in more detail below, unsupervised training with unpaired or unlabeled training data may be employed to train the first generator stage 102 to generate the intermediate representation $M_s$ 110 of an image, and supervised training with paired or labeled training data may be employed to train the second generator stage 104 to generate the conditional image 114 based on the intermediate representation $M_s$ 110 of the image. Because semi-supervised training relies on unpaired data to train the first generator stage 104 to generate the intermediate representation $M_s$ 110, a better intermediate representation $M_s$ 110 is learned and ultimately a better final conditional image 114 is generated, in at least some embodiments, compared to systems in which only supervised learning is employed to train neural networks for generating conditional images. For example, a better intermediate representation $M_s$ 110 may be learned and ultimately a better final conditional image 114 may be generated because of greater availability of datasets with unpaired training data as compared to datasets with paired training data. Moreover, because an unconditional intermediate representation of an image generated by the first generator stage 102 is used as a structure-prior for conditional generation of the image by the second generator stage 104, less paired data may be needed an/or better learning may be achieved in training the second generator stage 104 to generate conditional images, in at least some embodiments, as compared to systems that do not generate an unconditional structure-prior for conditional image generation.

Referring still to FIG. 1, upon training of the first generator stage 102 for unconditional structure-prior generation and the second generator stage 104 for conditional image generation, the image synthesis system 100 may be utilized to generate high-fidelity and diverse image sets in a controllable manner, in various embodiments. For example, the image synthesis system 100 may be controlled to generate a set of images with a fixed structure and varying styles. This may be achieved by fixing the intermediate representation $M_s$ 110 at the output of the structure-prior generator 106 of the first generator stage 102 and varying the conditional input y 112 provided to the conditional generator 105 of the second generator stage 104, so that images with the same fixed structure and the varying styles are generated. As just an example, the intermediate representation $M_s$ 110 at the output of the structure-prior generator 106 may be fixed at a particular shape and posture of a bird. The conditional input y 112 may be varied to provide conditions such as i) "this bird has bright yellow body with brown on its crown and wings," ii) "this bird is completely red with black wings and pointy beak," ii) "this bird has wings that are brown and a white body," iii) "a bird with bright yellow belly colors of orange on its tail and beak," iv) "a small colorful bird with blue feathers covering most of its body except for its black tail," and so on. With the fixed intermediate representation $M_s$ 110 and the varied conditional input y 112, the image synthesis system 100 may generate a set of images depicting birds having the fixed particular shape and posture defined by the fixed intermediate representation $M_s$ 110, with respective ones of the images depicting birds that match the respective styles specified by the respective conditional inputs y 112. As another example, both the intermediate representation $M_s$ 110 and the conditional input y 112 may be fixed, and the image synthesis system 100 may be controlled to draw different samples around the conditional input y 112 to generate a set of images having the fixed structure and style, but with varying amount of fine-grained details, such as varying details in the background and/or the foreground of the images. As yet another example, the intermediate representation $M_s$ 110 at the output at the output of the structure-prior generator 106 may be fixed, and the conditional input y 112 may be slowly varied between two or more different conditions to cause the image synthesis system 100 to generate a set of images interpolating between the two or more different conditions.

Figure 2:
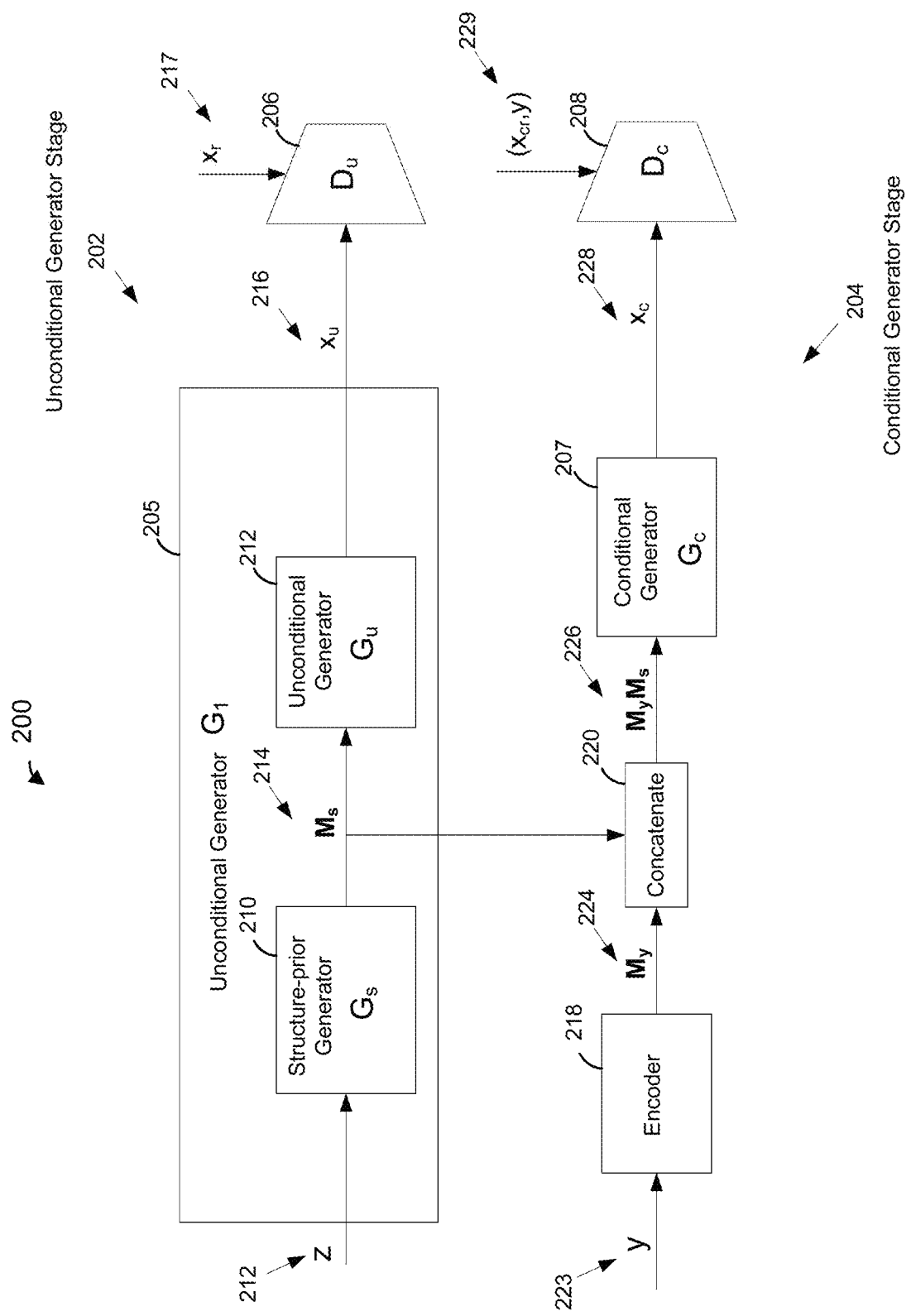
FIG. 2 is a block diagram of an example controllable image synthesis system corresponding to the controllable conditional image synthesis system of FIG. 1 and showing training components used in training of the image synthesis system of FIG. 1, according to an embodiment.

FIG. 2 is a block diagram of an image synthesis system 200 showing components used in training of an image synthesis system such as the image system 100 of FIG. 1, according to an embodiment. In an embodiment, the image synthesis system 200 corresponds to the image synthesis system 100 of FIG. 1. In other embodiments, the image synthesis system 200 is used to train image synthesis systems different from the image synthesis system 100 of FIG. 1. Similarly, the image synthesis system 100 of FIG. 1 is trained using training components different from the training components illustrated in FIG. 2, in some embodiments. For ease of explanation, the image synthesis system 200 is described below with reference to FIG. 1.

The image synthesis system 200 includes an unconditional generator stage 202 and a conditional generator stage 204. With reference to FIG. 1, the unconditional generator stage 202 corresponds to the first generator stage 102 and the conditional generator stage 204 corresponds to the second generator stage 104, in an embodiment. The unconditional generator stage 202 includes an unconditional generator $G_1$ 205 coupled to a discriminator $D_u$ 206 to form an unconditional GAN for training the unconditional generator stage 202. Similarly, the conditional generator stage 204 includes a conditional generator $G_c$ 207 (corresponding to the conditional generator 105 of FIG. 1) coupled to a discriminator $D_c$ 208 to form a conditional GAN (CGAN) for training the conditional generator stage 204.

With continued reference to FIG. 2, the unconditional generator $G_1$ 205 may include a structure-prior generator $G_s$ 210 (corresponding to the structure-prior generator 106 of FIG. 1) and an unconditional generator $G_u$ 212. In an embodiment, the unconditional generator $G_1$ 205 comprises a generative neural network, such as a deep neural network, that implements a function $G_1$, which may be a differentiable function. The unconditional generator $G_1$ 205, and the corresponding function $G_1$, and be may be split into a structure-prior generative sub-network, and corresponding function $G_s$, implemented by the structure-prior generator $G_s$ 210 and an unconditional generative sub-network, and corresponding function $G_u$, implemented by the unconditional generator $G_u$ 212. The discriminator $D_u$ 206 of the unconditional generator stage 202 may similarly comprise a neural network, such as a deep neural network, that implements a function $D_u$, which may be a differentiable function. In training the unconditional generator stage 202, the unconditional generator $G_1$ 210 and the discriminator $D_u$ 206 may be pitched against each other in a two-player min-max game in which the unconditional generator $G_1$ 210 tries to generate "fake" images that are as close as possible to real images, and the discriminator $D_u$ 206 tries to differentiate between fake images generated by the generator $G_1$ 210 and real images provided as training data to the discriminator $D_u$ 208. In an embodiment, training the first generator stage 202 may involve optimizing the min-max loss function:

$$\min_{G_1}\max_{D_u} V(D_u G_1) = \\ E_{x \sim p_{data}}[\log D_u(x)] + E_{z \sim p_z}[\log(1 - D_u(G_1(z)))] \quad \text{Equation 1}$$

The function $G_1$ in Equation 1 may be further decomposed into i) the function $G_s$ that takes as an input a random noise sample z 212, which may be a noise vector taken, for example, from a normal (e.g., Gaussian) distribution, and generates an intermediate representation $M_s$ 214 of a final unconditional image $x_u$ 216

$$M_s = G_s(z) \quad \text{Equation 2}$$

and ii) the function $G_u$ that takes as an input the intermediate representation $M_s$ 214 and generates the final unconditional image $x_u$ 216 using the intermediate representation $M_x$ 214 as a structure-prior that dictates the structure (e.g., posture, shape, etc.) of the unconditional image $x_u$ 216. Accordingly, the function $G_1$ in Equation 1 can be written as:

$$G_1(z) = G_u(M_s) \quad \text{Equation 3}$$

The intermediate representation $M_s$ 214 of a final image may generally capture high-level information for generating the final image. For example, intermediate representation $M_s$ 214 may capture a posture and structure of a bird, a shape of a face, etc., in various embodiments. Further, the intermediate representation $M_s$ 214 is generally independent of any specific style desired for the final image, in an embodiment. Training of the unconditional generator stage 202 may therefore be performed in an unsupervised manner using only unpaired training data, such as only data containing images of target images (e.g., birds), in an embodiment. For example, unconditional generator stage 202 may be trained to generate realistic images of birds using a dataset containing real images of birds, without any pairing of the images with conditions or descriptions of the birds. As another example, the unconditional generator stage 202 may be trained to generate realistic images of faces using a dataset containing real and unlabeled images of faces of celebrities.

The intermediate representation $M_s$ 214 generated by the unconditional generator stage 202 is provided to the conditional generator stage 204 and is used in training the conditional generator $G_c$ 207 of the conditional generator stage 204. In addition to the conditional generator $G_c$ 207, the conditional generator stage 204 includes an encoder 218 and a concatenate block 220. The encoder 218 may receive, as an input, a condition y 223 which may be, for example, in the form of text embedding, and may generate a tensor $M_y$ 224. In an embodiment, the encoder 218 generates the tensor $M_y$ 224 by performing condition augmentation of the condition y 223 using a sample of a latent variable c, which may be a sample taken, for example, from an independent Gaussian distribution. The latent variable c may then be repeated one or more times, if necessary, to match the spatial dimension of the intermediate representation $M_s$ 214. The concatenate block 220 may receive, as a first input, the tensor $M_y$ 224 generated by the encoder 218 and, as a second input, the intermediate representation $M_s$ 214 generated by the unconditional generator stage 202, and may concatenate the tensor $M_y$ 224 with the intermediate representation $M_s$ 214 to generate a concatenated tensor $M_y$ 226. The concatenate block 220 may, for example, comprise a convolutional block, such as, for example, a 3×3 convolutional block, and may perform tensor concatenation using the convolutional block. The concatenation block 220 may additionally perform batch normalization and/or apply a rely function to generate the concatenated tensor $M_y M_s$ 226. The concatenated tensor $M_y M_s$ 226 generated by the concatenate block 220 is provided to the conditional generator $G_c$ 207. Taking the concatenated tensor $M_y M_s$ 226 as an input, the conditional generator $G_c$ 207 may generate the final conditional image $x_c$ 228 to generally match both the structure defined by the intermediate representation $M_s$ 214 and the style captured by the tensor $M_y$ 224, in an embodiment.

Referring still to FIG. 2, the conditional generator $G_c$ 207 may comprise a generative neural network, such as a deep neural network, implementing a function $G_c$, which may be a differentiable function. Similarly, the discriminator $D_c$ 208 may comprise a neural network, such as a deep neural network, that implements a function $D_c$, which may be a differentiable function. In training the second generator stage 204, the conditional generator $G_s$ 207 and the discriminator $D_c$ 208 may be pitched against each other in a two-player min-max game in which the conditional generator $G_c$ 207 tries to generate "fake" images conditioned on the condition y 223 that are as close to possible to real images that match the condition y 223, and the discriminator $D_c$ 208 tries to differentiate between the fake images generated by the generator $G_c$ 207 and real images paired with corresponding conditions provided as training data to the discriminator $D_c$ 208. Training the second generator stage 204 may involve optimizing the min-max loss function:

$$\min_{G_c}\max_{D_c} V(D_c G_c) = \\ E_{x \sim p_{data}}[\log D_c(x \mid y)] + E_{z \sim p_z}[\log(1 - D_c(G_c(G_u(z) \mid y)))] \quad \text{Equation 4}$$

With continued reference to FIG. 2, in an embodiment, the unconditional generator stage 202 and the conditional generator stage 204 are trained concurrently end-to-end, wherein a loss function for training the unconditional generator stage 202, such as the loss function of Equation 1, is optimized concurrently with optimization of a loss function for training the conditional generator stage 204, such as the loss function of Equation 4. FIG. 3 illustrates a training algorithm 300 utilized for concurrently training the unconditional generator stage 202 and the conditional generator stage 204, according to an embodiment. The algorithm 300 may be implemented by the image synthesis system 200 with the following parameters. In training the unconditional generator stage 202: the noise vector z 212 is a vector $z \in \mathbb{R}^{d \times 1}$ sampled from a normal distribution (i.e., $z \sim N(0, I)$), where d is the dimensionality of the latent space; $G_s(z, \theta_s)$ is the function implemented by the structure-prior generator sub-network $G_s$ 210 to generate the intermediate representation $M_s \in \mathbb{R}^{s \times s \times k}$; $G_u(M_s, \theta_s)$ is the function implemented by the unconditional generator sub-network $G_u$ 212 to generate the final unconditional image $x_u$ 216 using the intermediate representation $M_s$ as a structure-prior input; and $D_u(x, \theta_{du})$ is the function implemented by the discriminator $D_u$ 206 to determine whether an image is a fake unconditional image $x_u$ 216 or a real image $x_r$ 217 that may be provided as training data to the discriminator $D_u$ 206. In training the conditional generator stage 204: $E(\theta_e, y)$ is the function implemented by the encoder 218 to encode the condition y 223, which may be in the form of text embedding, $y \in \mathbb{R}^{p \times 1}$ to generate the tensor $M_y$ 224, which may be the tensor $My \in \mathbb{R}^{s \times s \times q}$; $G_c(M_y, M_s, \theta_y)$ is the function implemented by the conditional generator $G_c$ 207 to generate the final "fake" conditional image $x_c$ 228 using $M_y$ concatenated with $M_s$ as a structure-prior input; and $D_c(x, y, \theta_{dc})$ is the function implemented by the discriminator $D_c$ 208 to determine whether an image is a fake conditional image $x_c$ that matches the condition y 223 or a real image $x_{cr}$ with corresponding matching condition $(x_{cr}, y)$ 229 that may be provided as training data to the discriminator $D_c$ 208. To generate the tensor $M_y$ 224, the encoder 218 may perform condition augmentation to sample latent variable $\hat{c} \in \mathbb{R}^{q \times 1}$ from an independent Gaussian distribution $N(\mu(y), \Sigma(y))$ around the text embedding. With such parameters, the training algorithm 300 may be used to train the unconditional generator stage 202 and the conditional generator stage 204 concurrently end-to-end in alternating steps until the convergence of the algorithm 300, in an embodiment. Parameters of the neural networks of the unconditional generator stage 202 and the conditional generator stage 204 may be updated in each step by optimizing the following combined objectives of the GAN of the unconditional generator stage 202 and the CGAN of the conditional generator stage 204:

$$L_{G_u} = \log D_u(G_u(z))$$

$$L_{D_u} = \log D_u(x)$$

$$L_{D_c} = \log D_c(x, y)$$

$$L_{G_c} = \log D_c(G_c(M_y, M_s), y) + \lambda D_{KL}(N(\mu(y), \Sigma(y)) \| N(0, I)) \quad \text{Equation 5}$$

Figure 4A:
FIGS. 4A-4C are illustrations of several controllable aspects of the image synthesis system FIG. 1, according to embodiments.
Figure 4B:
Figure 4C:
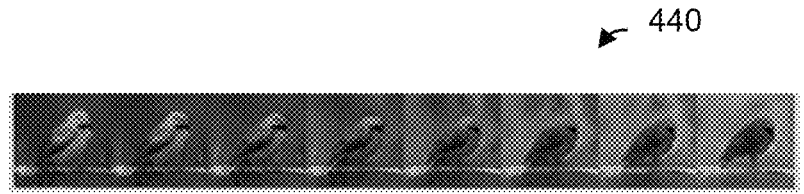

In various embodiments, an image synthesis system (e.g., the image synthesis system 100 of FIG. 1 or the image synthesis system 200 of FIG. 2) trained, for example as described above, to generate intermediate representations of images, and to generate conditional images based on intermediate representations generated for the images, may be operated to generate various sets of images containing predictable and controlled features and styles of the images. FIGS. 4A-4C are illustrations of several controllable aspects of an image synthesis system such as the image synthesis system 100 of FIG. 1 or the image synthesis system 200 of FIG. 2.

Referring first to FIG. 4A, the image synthesis system may generate a set of images 400, such as birds, having fixed structure, such as posture, but with varying style features, such varying colors or beak sizes, in this example scenario. To generate the set of images 400, an intermediate representation Ms may be generated based on a random sample z, which may be taken from a normal (e.g., Gaussian) distribution. The intermediate representation Ms may then be fixed, and varying conditions y may be provided to a conditional generator stage to generate the set of images 400 having fixed structure and varying styles.

Referring now to FIG. 4B, the image synthesis system may generate a set of images 420, such as birds, having fixed structure, such as posture, but with varying image details, such as varying bird styles and backgrounds, in this example scenario. Similar to the scenario of FIG. 4A, to generate the set of images 420, an intermediate representation $M_s$ may be generated based on a random sample z, and the intermediate representation $M_s$ may then be fixed. Unlike the scenario of FIG. 4A, however, in the scenario of FIG. 4B a condition y, such as a fixed text embedding, provided to the conditional generator stage may also be fixed. The conditional generator stage (e.g., an encoder 218 of the conditional generator stage) may generate varying tensors $M_y$ around the fixed text embedding. The varying tensors $M_y$ may be concatenated with the fixed intermediate representation $M_s$, and the resulting varying concatenated tensors $M_y M_s$ may be used as structure-priors to generate the set of images 420 having images with same structures and styles, but with different fine-grained details.

Referring now to FIG. 4C, the image synthesis system may generate a set of images 440, such as birds, having fixed structure, such as posture, with interpolation between two or more different styles, in this example scenario. In this scenario, an intermediate representation $M_s$ may be generated by an unconditional generator stage based on a random sample z, and the intermediate representation $M_s$ may then be fixed. A condition y provided to a conditional generator stage may then be slowly varied from a first style to a second such that the conditional generator stage generates the set of images 440 depicting interpolation from the first style to the second style.

Figure 5:
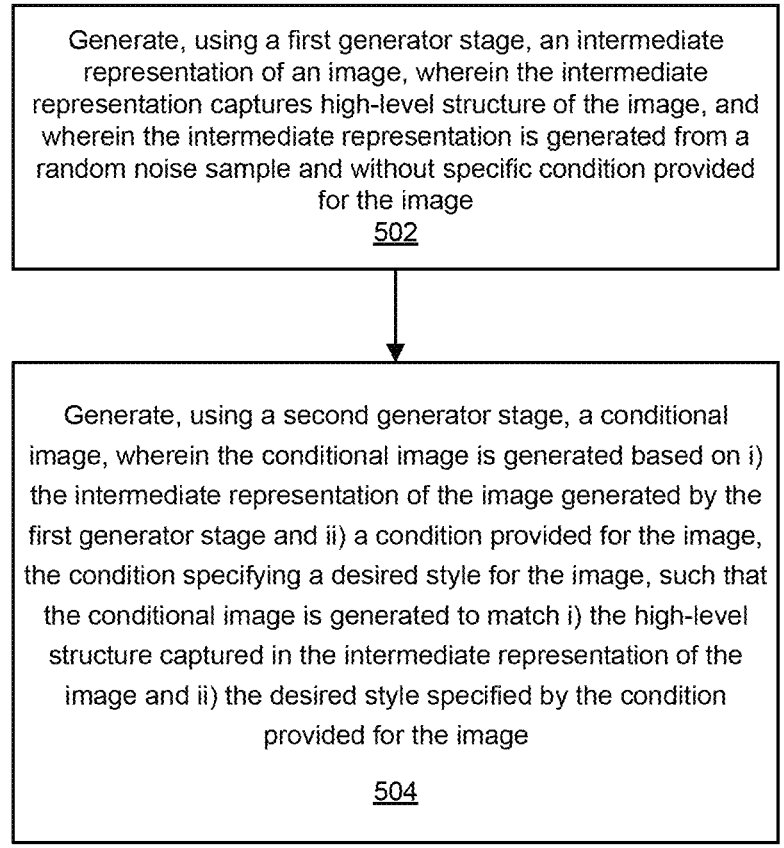
FIG. 5 is a flow diagram illustrating an example method for generating images that may be implemented by the image synthesis system of FIG. 1, according to an embodiment.

FIG. 5 is a flow diagram of a method 500 for generating images in an image synthesis system, according to an embodiment. In an embodiment, the method 500 is implemented in conjunction with the image syntheses system 100 of FIG. 1 and/or image synthesis system 200 of FIG. 2. In other embodiments, the method 500 is implemented in conjunction with image synthesis systems different from the image synthesis system 100 of FIG. 1 and/or the training system 200 of FIG. 2.

At block 502, an intermediate representation of an image is generated by a first generator stage of the image synthesis system. The first generator stage may comprise an unconditional generator, and may generate the intermediate representation of the image by random sampling and without any specific condition provided for the image. The intermediate representation of the image may capture high-level information for generating the image. For example, the intermediate representation of the image may capture a structure, an outline, a shape, a posture, etc. of a target object in the image. In an embodiment, the first generator stage 102 of FIG. 1 generates the intermediate image. For example, the structure-prior generator 106 of the first generator stage 102 of FIG. 1 generates the intermediate representation of the image. In another embodiment, the structure-prior generator 206 of FIG. 2 generates the intermediate representation of the image. In other embodiments, the intermediate representation of the image is generated by other suitable generator components and/or in other suitable image synthesis systems.

At block 504, a conditional image is generated by a second generator stage of the image synthesis system based on the intermediate representation of the image generated at block 502 by the first generator stage. The second generator stage may comprise a conditional generator, and may generate the conditional image further based on a condition specified for the image. As a result, the conditional image may be generated to match i) the high-level structure captured in the intermediate representation of the image and ii) the desired style specified by the condition provided for the image. In an embodiment, the second generator stage 104 of FIG. 1 generates the conditional image. In another embodiment, the second generator stage 204 of FIG. 2 generates the conditional image. In other embodiments, the conditional image is generated by other suitable generator components and/or in other suitable image synthesis systems.

Figure 6:
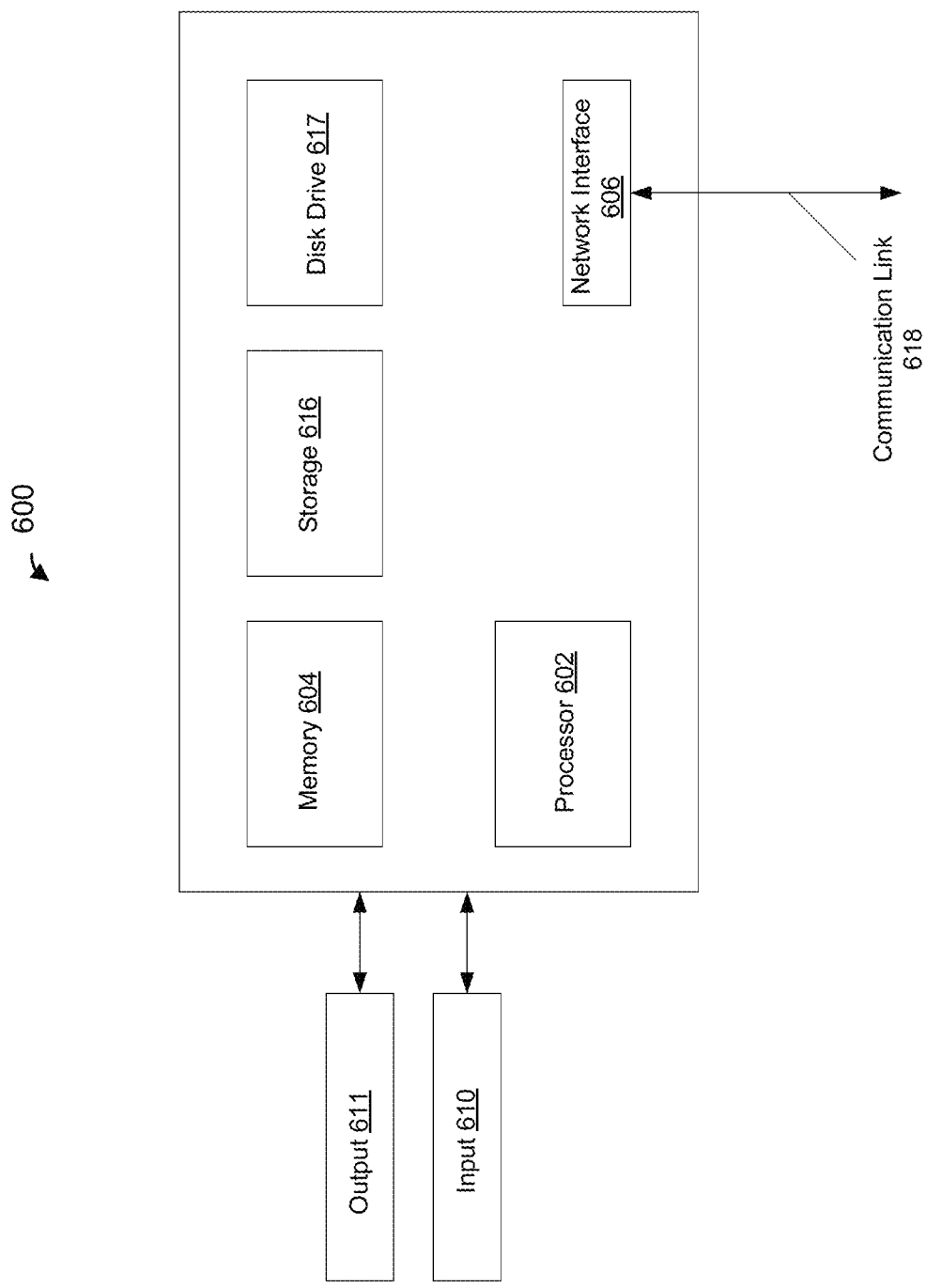
FIG. 6 is a block diagram of a computer system suitable for implementing one or more components of the images synthesis system of FIG. 1, according to an embodiment.

FIG. 6 is a block diagram of a computer system 600 suitable for implementing one or more embodiments of the present disclosure. In its most basic configuration, the computing system 600 may include at least one processor 602 and at least one memory 604. The computer system 600 may also include a bus (not shown) or other communication mechanism for communicating information data, signals, and information between various components of computer system 600. Components may include an input component 610 that processes a user action, such as selecting keys from a keypad/keyboard, selecting one or more buttons or links, etc., and sends a corresponding signal to the at least one processor 602. Components may also include an output component, such as a display, 611 that may display, for example, results of operations performed by the at least one processor 602. A transceiver or network interface 606 may transmit and receive signals between computer system 600 and other devices, such as user devices that may utilize results of processes implemented by the computer system 600. In one embodiment, the transmission is wireless, although other transmission mediums and methods may also be suitable.

The at least one processor 602, which can be a micro-controller, digital signal processor (DSP), or other processing component, processes these various signals, such as for display on computer system 600 or transmission to other devices via a communication link 618. The at least one processor 602 may also control transmission of information, such as cookies or IP addresses, to other devices. The at least one processor 602 may execute computer readable instructions stored in the memory 604. The computer readable instructions, when executed by the at least one processor 602, may cause the at least one processor 602 to implement processes associated with image generation and/or training.

Components of computing system 600 may also include at least one static storage component 616 (e.g., ROM) and/or at least one disk drive 617. Computer system 600 may perform specific operations by processor 612 and other components by executing one or more sequences of instructions contained in system memory component 604. Logic may be encoded in a computer readable medium, which may refer to any medium that participates in providing instructions to the at least one processor 602 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 604, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of an image synthesis system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for synthesizing an image, the method comprising generating, using a first generator stage of an image synthesis computer system, an intermediate representation of an image, wherein the intermediate representation captures at least a particular high-level structure of the image, and wherein the first generator stage is initialized by a random noise sample to generate the intermediate representation of the image without specific condition provided for the image, wherein the random noise sample at least in part determines the particular high-level structure of the image; and generating, using a second generator stage of the image synthesis computer system, a conditional image, wherein the conditional image is generated based on i) the intermediate representation of the image generated by the first generator stage and ii) a condition provided for the image, the condition specifying a desired style for the image, such that the conditional image is generated to match i) the particular high-level structure captured in the intermediate representation of the image and ii) the desired style specified by the condition provided for the image.

2. The method of claim 1, wherein:
the first generator stage comprises an unconditional generative neural network, and
the second generator stage comprises a conditional generative neural network.

3. The method of claim 2, wherein the unconditional generative neural network comprises i) a structure-prior generative sub-network trained to generate the intermediate representation of the image and ii) an unconditional generative sub-network trained to generate an unconditional image based on the intermediate representation of the image.

4. The method of claim 2, further comprising
training the unconditional generative neural network using an unconditional generative adversarial network (GAN), and
training the conditional generative neural network using a conditional generative adversarial network (CGAN).

5. The method of claim 2, further comprising training the unconditional generative neural network and the conditional generative neural network concurrently using semi-supervised training, wherein the unconditional generative neural network is trained using unpaired data and the conditional generative neural network is trained using paired data.

6. The method of claim 1, wherein
the method further comprises concatenating the intermediate representation with a tensor representing a sample drawn around the condition provided for the image, and
generating the conditional image includes using the concatenated intermediate representation with the tensor as a structure-prior for generating the conditional image.

7. The method of claim 1, further comprising
fixing the intermediate representation, and
generating a set of conditional images, wherein respective conditional images in the set of conditional images are generated based on i) the fixed intermediate representation of the image and ii) one or both of a) respective varying conditions provided for the respective conditional images and b) respective samples drawn around a fixed condition provided for the conditional images.

8. The method of claim 1, wherein the condition provided for the image comprises one of i) a text description of the desired style for the image and ii) an attribute set having one or more attributes defining the desired style of the image.

9. An image synthesis computer system, comprising:
a first generator stage configured to generate an intermediate representation of an image, wherein the intermediate representation captures at least a particular high-level structure of the image, and wherein the first generator stage is initialized by a random noise sample to generate the intermediate representation of the image without specific condition provided for the image, wherein the random noise sample at least in part determines the particular high-level structure of the image; and
a second generator stage configured to generate a conditional image, wherein the conditional image is generated based on i) the intermediate representation of the image and ii) a condition provided for the image, the condition specifying a desired style for the image, such that the conditional image is generated to match i) the particular high-level structure captured in the intermediate representation of the image and ii) the desired style specified by the condition provided for the image.

10. The image synthesis computer system of claim 9, wherein:
the first generator stage comprises an unconditional generative neural network, and
the second generator stage comprises a conditional generative neural network.

11. The image synthesis computer system of claim 10, wherein the unconditional generative neural network comprises a structure-prior generative sub-network trained to generate the intermediate representation of the image and an unconditional generative sub-network trained to generate an unconditional image based on the intermediate representation of the image.

12. The image synthesis computer system of claim 10, wherein
the unconditional generative neural network is trained using an unconditional generative adversarial network (GAN), and
the conditional generative neural network is trained using a conditional generative adversarial network (CGAN).

13. The image synthesis computer system of claim 10, wherein the unconditional generative neural network and the conditional generative neural network are trained concurrently using semi-supervised training, wherein the unconditional generative neural network is trained using unpaired data and the conditional generative neural network is trained using paired data.

14. The image synthesis computer system of claim 10, wherein the second generator stage is further configured to
concatenate the intermediate representation with a tensor representing a sample drawn around the condition provided for the image, and
generate the conditional image includes using the concatenated intermediate representation with the tensor as a structure-prior for generating the conditional image.

15. The image synthesis computer system of claim 9, wherein the condition provided for the image comprises one of i) a text description of the desired style for the image and ii) an attribute set having one or more attributes defining the desired style of the image.

16. The tangible computer-readable medium or media of claim 15, further storing machine readable instructions that, when executed by the one or more processors, cause the one or more processors to
train the unconditional generative neural network using an unconditional generative adversarial network (GAN), and
train the conditional generative neural network using a conditional generative adversarial network (CGAN).

17. The tangible computer-readable medium or media of claim 15, further storing machine readable instructions that, when executed by the one or more processors, cause the one or more processors to train the unconditional generative neural network and the conditional generative neural network concurrently using semi-supervised training, wherein the unconditional generative neural network is trained using unpaired data and the conditional generative neural network is trained using paired data.

18. A tangible computer readable medium, or media, storing machine readable instructions that, when executed by one or more processors, cause the one or more processors to:
generate an intermediate representation of an image, wherein the intermediate representation captures at least a particular high-level structure of the image, and wherein the first generator stage is initialized by a random noise sample to generate the intermediate representation of the image without specific condition provided for the image, wherein the random noise sample at least in part determines the particular high-level structure of the image; and generate a conditional image, wherein the conditional image is generated based on i) the intermediate representation of the image and ii) a condition provided for the image, the condition specifying a desired style for the image, such that the conditional image is generated to match i) the particular high-level structure captured in the intermediate representation of the image and ii) the desired style specified by the condition provided for the image.

19. The tangible computer readable medium, or media, of claim 18, wherein:
   the first generator stage comprises an unconditional generative neural network, and
   the second generator stage comprises a conditional generative neural network.

20. The tangible computer readable medium, or media, of claim 19, wherein the unconditional generative neural network comprises a structure-prior generative sub-network trained to generate the intermediate representation of the image and an unconditional generative sub-network trained to generate an unconditional image based on the intermediate representation of the image.

* * * * *